United States Patent
Ohnishi et al.

(10) Patent No.: US 10,927,255 B2
(45) Date of Patent: Feb. 23, 2021

(54) POLYARYLENE SULFIDE RESIN COMPOSITION AND INSERT MOLDED ARTICLE

(71) Applicant: Polyplastics Co., Ltd., Tokyo (JP)

(72) Inventors: Katsuhei Ohnishi, Fuji (JP); Hiroki Arai, Fuji (JP); Kuniaki Matsuda, Fuji (JP)

(73) Assignee: POLYPLASTICS CO., LTD., Tokyo (JP)

(*) Notice: Subject to any disclaimer, the term of this patent is extended or adjusted under 35 U.S.C. 154(b) by 216 days.

(21) Appl. No.: 16/065,479

(22) PCT Filed: Dec. 20, 2016

(86) PCT No.: PCT/JP2016/087950
§ 371 (c)(1),
(2) Date: Jun. 22, 2018

(87) PCT Pub. No.: WO2017/110807
PCT Pub. Date: Jun. 29, 2017

(65) Prior Publication Data
US 2019/0002693 A1    Jan. 3, 2019

(30) Foreign Application Priority Data

Dec. 25, 2015 (JP) .............................. JP2015-253994

(51) Int. Cl.

| | | |
|---|---|---|
| *C08L 81/04* | (2006.01) | |
| *B29C 45/14* | (2006.01) | |
| *C08L 33/14* | (2006.01) | |
| *C08L 81/02* | (2006.01) | |
| *B29C 45/00* | (2006.01) | |
| *C08K 5/13* | (2006.01) | |
| *C08K 7/04* | (2006.01) | |
| *B29C 45/34* | (2006.01) | |
| *B29K 81/00* | (2006.01) | |
| *B29K 105/00* | (2006.01) | |
| *B29K 105/16* | (2006.01) | |
| *B29K 509/00* | (2006.01) | |
| *B29K 705/00* | (2006.01) | |

(52) U.S. Cl.
CPC .............. *C08L 81/04* (2013.01); *B29C 45/00* (2013.01); *B29C 45/0001* (2013.01); *B29C 45/14* (2013.01); *C08L 33/14* (2013.01); *C08L 81/02* (2013.01); *B29C 45/34* (2013.01); *B29K 2081/04* (2013.01); *B29K 2105/0044* (2013.01); *B29K 2105/0094* (2013.01); *B29K 2105/16* (2013.01); *B29K 2509/00* (2013.01); *B29K 2705/00* (2013.01); *C08K 5/13* (2013.01); *C08K 7/04* (2013.01); *C08L 2201/08* (2013.01); *C08L 2205/025* (2013.01); *C08L 2205/03* (2013.01)

(58) Field of Classification Search
CPC ..... B29C 45/14; B29C 45/00; B29C 45/0001; B29C 45/34; B29K 2081/04; B29K 2105/0044; B29K 2105/0094; B29K 2105/16; B29K 2509/00; B29K 2705/00; C08K 5/13; C08K 7/04; C08L 33/14; C08L 81/02; C08L 81/04; C08L 2201/08; C08L 2205/025; C08L 2205/03
See application file for complete search history.

(56) References Cited

U.S. PATENT DOCUMENTS

2012/0237714 A1    9/2012    Nishikawa et al.

FOREIGN PATENT DOCUMENTS

| JP | 2002-3716 A | 1/2002 |
|---|---|---|
| JP | 2002-235003 A | 8/2002 |
| JP | 2005-161693 A | 6/2005 |
| JP | 2006-1955 A | 1/2006 |
| JP | 2011-173946 A | 9/2011 |
| JP | 2014-148636 A | 8/2014 |
| JP | 2014-240134 A | 12/2014 |
| WO | 2011/070968 A1 | 6/2011 |
| WO | 2017/010364 A1 | 1/2017 |

OTHER PUBLICATIONS

Machine English translation of JP 2006-001955, Oonishi, Jan. 5, 2006.*
Machine English translation of JP 2011-173946, Kodama et al., Sep. 8, 2011.*
International Search Report dated Feb. 14, 2017, issued in counterpart International Application No. PCT/JP2016/087950 (2 pages).

* cited by examiner

*Primary Examiner* — Patrick D Niland
(74) *Attorney, Agent, or Firm* — Westerman, Hattori, Daniels & Adrian, LLP

(57) ABSTRACT

A polyarylene sulfide resin composition characterized by comprising a polyarylene sulfide resin, and an olefinic copolymer comprising an α-olefin-derived structural unit and an α,β-unsaturated acid glycidyl ester-derived structural unit, wherein the olefinic copolymer content is at least 1.0 parts by mass and less than 5.0 parts by mass with respect to 100 parts by mass of the polyarylene sulfide resin, a melt viscosity of the polyarylene sulfide resin measured at 310° C. and a shear rate of 1216 sec$^{-1}$ is at least 70 Pa·s and at most 300 Pa·s, and a flow length for a width of 20 mm and a thickness of 1 mm, at a cylinder temperature of 320° C., an injection pressure of 100 MPa and a mold temperature of 150° C., is at least 80 mm and at most 200 mm.

7 Claims, 4 Drawing Sheets

POLYARYLENE SULFIDE RESIN COMPOSITION AND INSERT MOLDED ARTICLE

TECHNICAL FIELD

The present invention relates to a polyarylene sulfide resin composition and an insert molded article.

BACKGROUND ART

The replacement of a part or whole of a metallic component with a resin composition, the so-called "resinification" of metal components, has been progressing in recent years. Components containing an insert molded article are known as components wherein a part of the metal component has been resinified. An insert molded article is a molded article formed in a manner integrating an insert member which contains a metal etc. and a resin member which contains a thermoplastic resin composition. However, the coefficient of thermal expansion and coefficient of contraction, caused by a change in temperature, differ greatly between the metal etc. and the thermoplastic resin composition forming the insert molded article. Therefore, a change in temperature during use can lead to breakage of the insert molded article. As such, insert molded articles are required to be heat shock resistant. In particular, when an insert molded article is used as a component around the engine of an automobile, even higher heat shock resistance is required, together with high flowability so as to enable formation of thin resin portions in a complex structure.

As resin compositions having heat shock resistance, resin compositions wherein a copolymer is combined with a polyarylene sulfide resin are known. However, copolymers usually have lower heat resistance than polyarylene sulfide resins, so gases originating from the copolymers are generated when inserts are molded, and the gases, by adhering to the molds, can lead to mold deposit formation. In which case, molds are exchanged more frequently, and molding efficiency decreases. Techniques that suppress mold deposits by focusing on the contents of glycidyl ester-derived components in copolymers (Patent Document 1) and techniques that impart heat shock resistance without using copolymers (Patent Document 2) have been proposed.

Patent Document 1: WO 2011/070968 A
Patent Document 2: JP 2014-148636 A

SUMMARY OF THE INVENTION

The present inventors conducted intensive research in order to further advance the above-mentioned techniques to obtain a resin composition capable of better suppressing mold deposit formation than conventional products while maintaining good flowability and heat shock resistance of the molded article. When the amount of mold deposit-causing copolymers added is reduced to improve the effect of mold deposit suppression, the heat shock resistance of the molded article decreases. In contrast, when the amount of copolymers added is increased to improve heat shock resistance, not only does the formation of mold deposit increase, the flowability of the resin composition decreases and moldability is reduced. When flowability decreases, a high molding temperature is required for accurately forming detailed structures, and in which case, mold deposits further increase. In other words, it was difficult to further improve the effect of mold deposit suppression while maintaining flowability and heat shock resistance. However, the present inventors, in the research process, found that by increasing the viscosity of the polyarylene sulfide resin, it was possible to maintain heat shock resistance and flowability even when the amount of copolymers added was reduced. With further research, the present inventors found that by setting the viscosity of the polyarylene sulfide resin and the content of the copolymers within certain ranges, it was possible to better suppress mold deposit formation than conventional products while maintaining heat shock resistance and flowability, leading to the completion of the present invention.

The present invention addresses the problem of providing a polyarylene sulfide resin excelling in flowability and heat shock resistance for the molded article and being capable of suppressing mold deposits during molding, and an insert molded article using said resin composition.

The polyarylene sulfide resin composition according to the present invention is characterized by comprising a polyarylene sulfide resin, and an olefinic copolymer comprising an α-olefin-derived structural unit and an α,β-unsaturated acid glycidyl ester-derived structural unit, wherein the olefinic copolymer content is at least 1.0 parts by mass and less than 5.0 parts by mass with respect to 100 parts by mass of the polyarylene sulfide resin; a melt viscosity of the polyarylene sulfide resin, measured at 310° C. and a shear rate of 1216 sec$^{-1}$, is at least 70 Pa·s and at most 250 Pa·s; and a flow length for a width of 20 mm and a thickness of 1 mm, at a cylinder temperature of 320° C., an injection pressure of 100 MPa and a mold temperature of 150° C., is at least 80 mm and at most 200 mm.

In the present invention, the olefinic copolymer preferably further comprises a (meth)acrylic acid ester-derived structural unit.

In the present invention, an inorganic filler is preferably further included. Moreover, the inorganic filler is more preferably fibrous. The inorganic filler content is further preferably at least 20 parts by mass and at most 80 parts by mass with respect to 100 parts by mass of the polyarylene sulfide resin.

In the present invention, an antioxidant is preferably further included. Additionally, the antioxidant is more preferably a phenolic antioxidant. The antioxidant content is further preferably more than 0 parts by mass and at most 1.5 parts by mass with respect to 100 parts by mass of the polyarylene sulfide resin.

The insert molded article according to the present invention is characterized by having a resin member comprising the polyarylene sulfide resin composition described in any one of the above passages, and an insert member comprising a metal, an alloy or an inorganic solid.

According to the present invention, it is possible to provide a polyarylene sulfide resin excelling in flowability and heat shock resistance for the molded article and being capable of suppressing mold deposits during molding, and an insert molded article using said resin composition.

MODES FOR CARRYING OUT THE INVENTION

Figure 1:
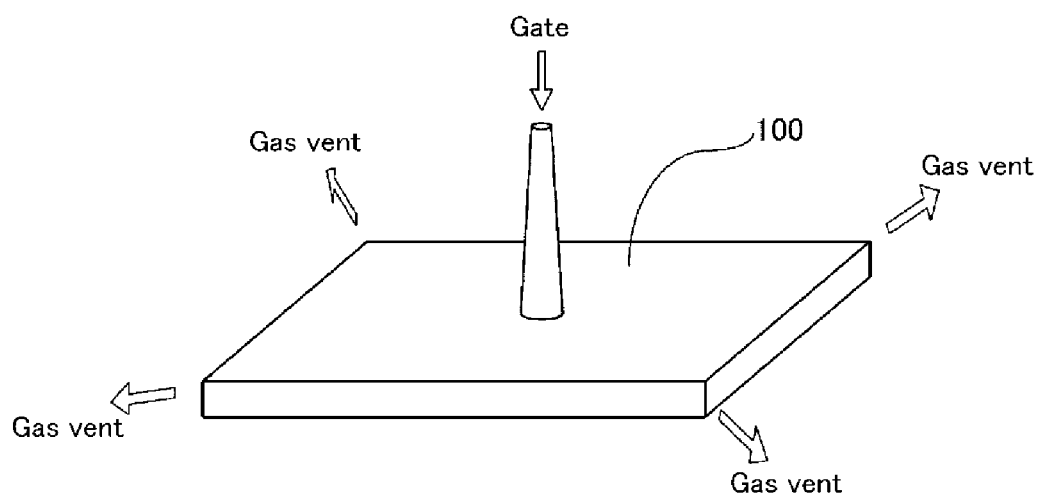
FIG. 1 is an explanatory drawing for the number-of-consecutive-shots evaluation test.

An embodiment of the present invention shall be explained in detail below. The present invention is not limited by the following embodiment, and can be carried out with appropriate modifications so long as the effects of the present invention are not hindered.

[Polyarylene Sulfide Resin Composition]

The polyarylene sulfide resin composition (hereinafter simply referred to as "resin composition") comprises a polyarylene sulfide resin and an olefinic copolymer.

(Polyarylene Sulfide Resin)

The polyarylene sulfide resin is a resin having a repeating unit represented by the following general formula (I).

—(Ar—S)— (I)

(wherein Ar represents an arylene group.)

The arylene group includes, but is not particularly limited to, for example, p-phenylene group, m-phenylene group, o-phenylene group, substituted phenylene group, p,p'-diphenylene sulfone group, p,p'-biphenylene group, p,p'-diphenylene ether group, p,p'-diphenylene carbonyl group, and naphthalene group. Among the repeating units represented by the above-mentioned general formula (I), the polyarylene sulfide resin, other than being a homopolymer using the same repeating units, may be a copolymer comprising heterogeneous repeating units depending on the usage.

The homopolymer preferably has a p-phenylene sulfide group as the repeating unit, with a p-phenylene group as the arylene group. This is because homopolymers having a p-phenylene sulfide group as the repeating unit have very high heat resistance and exhibit high strength, high rigidity and further high dimensional stability across a wide range of temperatures. By using such a homopolymer, a molded article having excellent physical properties can be obtained.

As for the copolymer, a combination of two or more different arylene sulfide groups from the above-mentioned arylene group-containing arylene sulfide groups may be used. Among these groups, combinations comprising a p-phenylene sulfide group and an m-phenylene sulfide group are preferable, considering that they produce molded articles excelling in physical properties such as heat resistance, moldability and mechanical properties. Polymers comprising at least 70 mol % of p-phenylene sulfide group are more preferable, and polymers comprising at least 80 mol % of p-phenylene sulfide group are even more preferable. Moreover, a polyarylene sulfide resin having a phenylene sulfide group is a polyphenylene sulfide resin (PPS resin).

Although polyarylene sulfide resins are known to include those having a substantially linear molecular structure without branches or crosslinking structures, and those having a structure with branches or crosslinks, in general, depending on the production method thereof, any type is effective in the present invention.

The polyarylene sulfide resin has a melt viscosity, measured at 310° C. and a shear rate of 1216 sec$^{-1}$ (hereinafter simply referred to as "melt viscosity") of at least 70 Pa·s and at most 250 Pa·s. By setting the melt viscosity at at least 70 Pa·s and at most 250 Pa·s, it is possible to maintain high heat shock resistance and good flowability even when the amount of the olefinic copolymer added is reduced, as mentioned above. As a result thereof, the effect of mold deposit suppression can be improved compared with conventional products, while heat shock resistance and flowability are maintained. The melt viscosity of the polyarylene sulfide resin is preferably at least 90 Pa·s and at most 170 Pa·s.

The method for producing the polyarylene sulfide resin is not specifically limited, and the resin can be produced by a conventionally-known production method. For example, the resin can be made by synthesizing a low-molecular-weight polyarylene sulfide resin, followed by polymerization in the presence of a known polymerization auxiliary at a high temperature to form a high-molecular-weight product.

(Olefinic Copolymer)

The resin composition comprises an olefinic copolymer. Due to the inclusion of the olefinic copolymer, the heat shock resistance of the molded article can be increased. The olefinic copolymer comprises, as copolymerization components, an α-olefin-derived structural unit and an α,β-unsaturated acid glycidyl ester-derived structural unit, among which, an olefinic copolymer comprising a (meth)acrylic acid ester-derived structural unit is preferable. For the olefinic copolymer, one type alone or a combination of two or more types may be used. Hereinafter, (meth)acrylic acid ester is also referred to as (meth)acrylate. For example, (meth)acrylic acid glycidyl ester is also referred to as glycidyl (meth)acrylate. Additionally, in the present specification, "(meth)acrylic acid" means both acrylic acid and methacrylic acid, and "(meth)acrylate" means both acrylate and methacrylate.

The α-olefin includes, but is not particularly limited to, ethylene, propylene, and butylene and the like. Among which, ethylene is preferable. For the α-olefin, one or two or more selected from the above may be used. The content of the α-olefin-derived copolymerization component may be, while not particularly limited to, for example, at least 1 mass % and at most 5 mass % in the entire resin composition.

As for the α,β-unsaturated acid glycidyl ester, examples include those having a structure represented by the following general formula (II).

[Chem. 1]

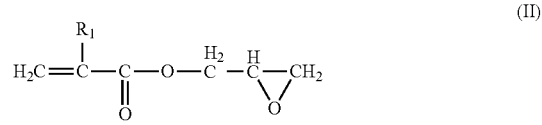

(II)

(wherein $R_1$ represents hydrogen or an alkyl group with a carbon number of at least 1 and at most 10.)

For the compound represented by the above-mentioned general formula (II), examples include acrylic acid glycidyl ester, methacrylic acid glycidyl ester (GMA), and ethacrylic acid glycidyl ester, among which, methacrylic acid glycidyl ester is preferable. For the α,β-unsaturated acid glycidyl ester, one type may be used alone, or two or more types may be used in combination. The content of the α,β-unsaturated acid glycidyl ester-derived copolymerization component is preferably at least 0.02 mass % and at most 0.10 mass % in the entire resin composition. When the content of the α,β-unsaturated acid glycidyl ester-derived copolymerization component is in this range, mold deposit formation can be better suppressed while maintaining heat shock resistance.

The (meth)acrylic acid ester includes, but is not particularly limited to, for example, methyl acrylate, ethyl acrylate, n-propyl acrylate, isopropyl acrylate, n-butyl acrylate, n-hexyl acrylate, n-octyl acrylate, methacrylic acid esters (for example, methyl methacrylate, ethyl methacrylate, n-propyl methacrylate, isopropyl methacrylate, n-butyl methacrylate, isobutyl methacrylate, n-amyl methacrylate, n-octyl methacrylate), among which, methyl acrylate is preferable. For the (meth)acrylate acid ester, one type may be used alone, or two or more types may be used in combination. The content of the (meth)acrylic acid ester-derived copolymerization component may be, while not particularly limited to, for example, at least 0.5 mass % and at most 2 mass % in the entire resin composition.

The olefinic copolymer comprising an α-olefin-derived structural unit and an α,β-unsaturated acid glycidyl ester-derived structural unit and the olefinic copolymer further comprising a (meth)acrylic acid ester-derived structural unit can be produced by copolymerization using conventionally known methods. For example, the above-mentioned olefinic copolymers can be obtained by copolymerization using the commonly-known radical polymerization reaction. The type of olefinic copolymer is not particularly limited, and may be, for example, a random copolymer or a block copolymer. Moreover, the above-mentioned olefinic copolymer may be, for example, an olefinic grafted copolymer chemically linked, in a branched or crosslinking manner, to a polymethyl methacrylate, polyethyl methacrylate, polymethyl acrylate, polyethyl acrylate, polybutyl acrylate, poly 2-ethyl hexyl acrylate, polystyrene, polyacrylonitrile, acrylonitrile-styrene copolymer, or a butyl acrylate-styrene copolymer.

The olefinic copolymer used in the present embodiment may comprise a structural unit derived from another copolymerization component so long as the effects of the present invention are not hindered.

More specifically, the olefinic copolymer may be, for example, a glycidyl methacrylate modified ethylenic copolymer or a glycidyl ether modified ethylenic copolymer, among which, a glycidyl methacrylate modified ethylenic copolymer is preferable.

Examples of the glycidyl methacrylate modified ethylenic copolymer include glycidyl methacrylate graft-modified ethylenic polymers, ethylene-glycidyl methacrylate copolymers, and ethylene-glycidyl methacrylate-methyl acrylate copolymers, among which, due to the ability to obtain particularly superior metal resin composite molded products, ethylene-glycidyl methacrylate copolymers and ethylene-glycidyl methacrylate-methyl acrylate copolymers are preferable, and ethylene-glycidyl methacrylate-methyl acrylate copolymers are particularly preferable. Specific examples of the ethylene-glycidyl methacrylate copolymers and ethylene-glycidyl methacrylate-methyl acrylate copolymers include "BONDFAST" (made by Sumitomo Chemical Co., Ltd.).

Examples of the glycidyl ether modified ethylenic copolymer include glycidyl ether graft-modified ethylenic polymers and glycidyl ether-ethylenic copolymers.

The olefinic copolymer content is at least 1 parts by mass and less than 5 parts by mass with respect to 100 parts by mass of the polyarylene sulfide resin. Since the olefinic copolymer content is at least 1.0 parts by mass and less than 5.0 parts by mass with respect to 100 parts by mass of the polyarylene sulfide resin, it is possible to improve the effect of suppressing mold deposits compared with the conventional. In the present embodiment, as mentioned above, by adjusting the viscosity of the polyarylene sulfide resin, it is possible to achieve high heat shock resistance even with a reduced olefinic copolymer content. Further, while the flowability of the resin composition tends to decrease when the viscosity of the polyarylene sulfide resin is increased, reducing the olefinic copolymer content can prevent a decrease in the flowability of the resin composition. That is, by setting the olefinic copolymer content to at least 1.0 parts by mass and less than 5.0 parts by mass, it is possible improve the effect of mold deposit suppression compared with the conventional while maintaining high heat shock resistance and good flowability.

The lower limit of the olefinic copolymer content is preferably at least 1.3 parts by mass, more preferably at least 3.0 parts by mass, with respect to 100 parts by mass of the polyarylene sulfide resin. The upper limit is preferably at most 4.9 parts by mass, more preferably at most 4.0 parts by mass, with respect to 100 parts by mass of the polyarylene sulfide resin.

(Inorganic Filler)

The resin composition preferably further comprises an inorganic filler. By including an inorganic filler, it is possible to reduce the proportion of the polyarylene sulfide resin in the resin composition and decrease the coefficient of thermal expansion of the resin composition while increasing the heat resistance and strength of the resin composition. As a result thereof, the difference of the coefficient of thermal expansion with the insert member of metal etc. in the insert molded article becomes smaller, and heat shock resistance can be further increased.

As the inorganic filler, a fibrous inorganic filler is preferable. Examples of the fibrous inorganic filler include glass fibers, carbon fibers, silica fibers, alumina fibers, potassium titanate, and wollastonite, among which, glass fibers are preferable. The inorganic filler preferably has an initial shape (the shape before melt-kneading) of at least 5 μm and at most 30 μm in diameter and at least 1 mm and at most 5 mm in length. The cross-sectional shape is not particularly limited, but may take a round shape or a flat shape.

The inorganic filler content is preferably at least 20 parts by mass and at most 80 parts by mass, more preferably at least 25 parts by mass and at most 75 parts by mass, with respect to 100 parts by mass of the polyarylene sulfide resin. By setting the inorganic filler content to at at least 20 parts by mass, the heat resistance and strength of the resin composition can be increased. Additionally, by setting the content to at most 80 parts by mass, decreases in the flowability of the resin composition can be prevented.

(Antioxidant)

The resin composition preferably further comprises an antioxidant. By including an antioxidant, thermal degradation of the olefinic copolymer is inhibited, gas generation is further prevented, and decreases in heat shock resistance can be prevented. As a result thereof, it is possible to further prevent mold deposit formation while maintaining high heat shock resistance.

The antioxidant is preferably a phenolic antioxidant. As the phenolic antioxidant, compounds having at least one alkyl phenolic group in the molecular structure can be provided as an example. Specific examples of the phenolic antioxidant include 2,6-di-tert-butyl-p-cresol, stearyl-(3,5-di-methyl-4-hydroxybenzyl)thioglycolate, stearyl-β-(4-hydroxy-3,5-di-tert-butylphenyl)propionate, distearyl-3,5-di-tert-butyl-4-hydroxybenzylphosphonate, distearyl(4-hydroxy-3-methyl-5-tert-butyl)benzylmalonate, 2,2'-methylenebis(4-methyl-6-tert-butylphenol), 4,4'-methylenebis(2,6-di-tert-butylphenol), 2,2'-methylenebis[6-(1-methylcyclohexyl)-p-cresol], bis[3,3-bis(4-hydroxy-3-tert-butylbutylphenyl)butyric acid]glycol ester, 4,4'-butylidenebis(6-tert-butyl-m-cresol), 1,1,3-tris(2-methyl-4-hydroxy-5-tert-butylphenyl)butane, 1,3,5-tris(3,5-di-tertbutyl-4-hydroxybenzyl)-2,4,6-trimethylbenzene, tetrakis[methylene-3-(3,5-di-tert-butyl-4-hydroxyphenyl)propionate]methane, 1,3,5-tris(3,5-di-tert-butyl-4-hydroxybenzyl)isocyanurate, 1,3,5-tris[(3,5-di-tert-butyl-4-hydroxyphenyl)propionyloxyethyl]isocyanurate, 2-octylthio-4,6-di(4-hydroxy-3,5-di-tert-butyl)phenoxy-1,3,5-triazine, 4,4'-thiobis(6-tert-butyl-m-cresol), triethyleneglycol-bis[3-(3-tert-butyl-5-methyl-4-hydroxyphenyl)propionate], 1,6-hexyldiol-bis[3-(3,5-di-tert-butyl-4-hydroxyphenyl)propionate], 2,4-bis-octylthio-6-(4-hydroxy-3,5-di-tert-butylanilino)-1,3,5-triazine, 2,2-thio-diethylenebis[3-(3,5-di-tert-butyl-4-hydroxyphenyl)propionate], N,N-hexamethylenebis(3,5-di-tert-butyl-4-hydroxy-hydrocinnamamide), 3,5-di-tert-butyl-4-hydroxy-benzylphosphonate-diethylester, 1,3,5-trimethyl-2,4,6-tris(3,5-di-tert-butyl-4-hydroxybenzyl)benzene, tris-(3,5-di-tert-butyl-4-hydroxybenzyl)isocyanurate, isooctyl-3-(3,5-di-tert-butyl-4-hydroxyphenyl)propionate, and 2,4-bis[(octylthio)methyl]-o-cresol. These can be used alone or as a combination of two or more.

From the perspective of better preventing generation of olefinic copolymer-derived gases, the antioxidant content is preferably more than 0 parts by mass and at most 1.5 parts by mass, more preferably at least 0.05 parts by mass and at most 1.2 parts by mass, with respect to 100 parts by mass of the polyarylene sulfide resin.

(Resin Composition)

The resin composition comprises the abovementioned polyarylene sulfide resin composition and olefinic copolymer. The resin composition has a flow length of at least 80 mm and at most 200 mm, for a thickness of 1 mm and a width of 20 mm at a cylinder temperature of 320° C., a mold temperature of 150° C., and an injection pressure of 100 MPa. When the flow length is at least 80 mm and at most 200 mm, flowability is considered to be good, and the molding of thin resin portions in a complex structure can be favorably carried out without using an excessively high molding temperature. As a result thereof, it is possible to better prevent increases in gas generation and the formation of mold deposits. As shown in the examples described below, with the resin composition in the present embodiment, it is possible to markedly suppress mold deposits during molding while maintaining excellent heat shock resistance even when the thickness of the molded article is as thin as about 1 mm. The above-mentioned flow length of the resin composition is preferably at least 95 mm and at most 200 mm.

As mentioned above, the flowability of the resin composition tends to decrease when the viscosity of the polyarylene sulfide resin is increased. Meanwhile, the flowability of the resin composition tends to increase when the olefinic copolymer content decreases. As such, the excellent flowability mentioned above can be maintained by adjusting the viscosity of the polyarylene sulfide resin and the olefinic copolymer content. Moreover, when an inorganic filler is included, the content of the filler also affects the flowability of the resin composition.

The resin composition has excellent flowability and heat shock resistance, and is capable of suppressing mold deposits during molding. Further, "heat shock resistance" is the ability to prevent breakage of the insert molded article due to temperature changes when the insert molded article is used in an environment of great temperature changes. Therefore, it is an ability different from impact resistance which prevents breakage of the molded article when subjected to an external physical impact or heat resistance which prevents deformation or breakage of the molded article when used at a high temperature exceeding the melting point of the resin composition.

The resin composition may contain other additives so long as the effects of the present invention are not hindered. Examples of other additives include burr inhibitors, mold releasing agents, nucleating agents, corrosion inhibitors, and carbon black. Burr inhibitors include, for example, branched polyphenylene sulfide resins, as described in WO 2006/068161 A and WO 2006/068159 A, and silane compounds. Examples of mold releasing agents include polyethylene waxes, fatty acid esters, and fatty acid amides. Examples of nucleating agents include boron nitride, talc, kaolin, carbon black, and carbon nanotubes. Examples of corrosion inhibitors include zinc oxide and zinc carbonate.

The method for producing the resin composition is not specifically limited, and the composition can be produced by melt-kneading the above-mentioned components using a known method. For example, any of the following methods can be used: methods wherein the components are mixed, then kneaded and extruded using an extruder to prepare a pellet; methods wherein pellets of different compositions are initially prepared, mixed in predetermined amounts for molding, and molded to obtain a molded article of the desired composition; and methods wherein one or two or more of the components are directly fed to a molding machine.

[Insert Molded Article]

The insert molded article has a resin member comprising the above-mentioned polyarylene sulfide resin composition and an insert member comprising a metal, an alloy, or an inorganic solid. The insert molded article has a resin member comprising the above-mentioned polyarylene sulfide resin composition, and therefore has excellent heat shock resistance. Moreover, since there is little mold deposit formation during molding, molding efficiency is high.

The metal, alloy, or inorganic solid constituting the insert member is not particularly limited, but preferably does not deform or melt when in contact with the resin during molding. Examples include metals such as aluminum, magnesium, copper, and iron, alloys of the above-mentioned metals such as brass, and inorganic solids such as glass and ceramics.

The method for producing the insert molded article is not particularly limited. For example, the above-mentioned resin composition and the insert member, preliminary formed into the desired shape, can be insert molded. Regarding insert molding, for example, composite molding can be carried out by preliminarily installing the insert member in the mold and filling the exterior thereof with the above-mentioned resin composition by injection molding or extrusion-compression molding etc.

There are no particular limitations concerning the shape or size of the insert molded article, and the shape can be determined in accordance with the use thereof. In particular, since the above-mentioned resin composition excels in flowability and heat shock resistance, even a molded article having a thin welded portion in the resin member can be easily molded without using an excessively high temperature, and it is possible to prevent breakage of the thin welded portion even when used in an environment of great temperature changes. For example, for the insert molded article, the resin member can have a thickness of at least 0.3 mm and at most 5 mm, at least 0.5 mm and at most 1.5 mm in particularly thin cases, and for example, it is possible to have an insert molded article that has a welded portion as thin as about 1 mm.

EXAMPLES

The present invention will be explained in further detail by referring to examples below, but the present invention is not to be construed as being limited by these examples.

Examples 1-12 and Comparative Examples 1-6

A polyarylene sulfide resin, an olefinic copolymer, and an antioxidant were dry-blended using materials indicated below, with the compositions and content ratios indicated in Table 1. These were fed into a twin screw extruder at a cylinder temperature of 320° C., and glass fibers were introduced, as necessary, into the extruder using a side feeder and melt-kneaded to obtain resin composition pellets.

Example 13

Other than dry-blending the polyarylene sulfide resin, an olefinic copolymer, and an antioxidant using materials indicated below, with the composition and content ratios indicated in Table 2, a resin composition pellet was obtained in the same manner as in Example 1.

(Polyarylene Sulfide Resins)
PPS-1: Polyphenylene sulfide resin, "Fortron KPS W220A" made by KUREHA Corporation
PPS-2: Polyphenylene sulfide resin, "Fortron KPS W214A" made by KUREHA Corporation
PPS-3: Polyphenylene sulfide resin, "Fortron KPS W205A" made by KUREHA Corporation
PPS-4: Polyphenylene sulfide resin, "Fortron KPS W203 A" made by KUREHA Corporation
PPS-5: Polyphenylene sulfide resin, "Fortron KPS W300" made by KUREHA Corporation (Melt Viscosity Measurement of Polyphenylene Sulfide Resins)

Using a capilograph made by Toyo Seiki Seisaku-sho, Ltd. and a flat die having a diameter of 1 mm and a length of 20 mm as the capillary, melt viscosity was measured at a barrel temperature of 310° C. and a shear rate of 1216 sec$^{-1}$. Results are shown in Tables 1 and 2.

(Olefinic Copolymers)
B-1: "BONDFAST 7L" made by Sumitomo Chemical Co., Ltd., containing as copolymerization components, 70 mass % ethylene, 3 mass % methacrylic acid glycidyl ester, and 27 mass % methyl acrylate
B-2: "BONDFAST 2C" made by Sumitomo Chemical Co., Ltd., containing as copolymerization components, 94 mass % ethylene and 6 mass % methacrylic acid glycidyl ester (Antioxidant)
C-1: "Irganox 1010" made by BASF Japan Ltd., containing as a phenolic compound, tetrakis[methylene-3-(3,5-di-tert-butyl-4-hydroxyphenyl)propionate]methane (Inorganic filler)
Glass fibers: "ECS 03 T747" made by Nippon Electric Glass Co., Ltd., having a diameter of 13 µm and a length of 3 mm

[Evaluation]
(Flowability)

The resin composition pellets obtained in the examples and comparative examples were molded into rod-like molded articles having a width of 20 mm and a thickness of 1 mm by injection molding under the conditions of a cylinder temperature of 320° C., an injection pressure of 100 MPa, and a mold temperature of 150° C., and flow lengths were measured. The average value of five tests was used as the flow length. Results are shown in Tables 1 and 2. As described above, when the flow length is at least 80 mm and at most 200 mm, thin resin portions can be molded in a complex structure without using an excessively high molding temperature.

(Number of Consecutive Shots)

When olefinic copolymer-derived gases adhere to the vent parts (vent holes) of a mold during molding and mold deposits form, the vent parts become blocked, gases cannot escape, and burning or a short shot occurs in the molded article. Consequently, the effect of suppressing mold deposit formation was evaluated by performing molding consecutively as described below and based on the number of molding shots until burning or a short shot occurred in the molded article.

FIG. 1 is an explanatory drawing for the number-of-consecutive-shots evaluation tests. As the mold, a mold which has gas vent sizes of a width of 4 mm, a depth of 6 µm, and a length of 30 mm and which can obtain the molded article 100 with molded article sizes of a length of 40 mm, a width of 40 mm, and a thickness of 2.5 mm, as shown in FIG. 1, was used. From the gate of this mold, the resin composition was injected into the mold under the conditions of a cylinder temperature of 340° C., a mold temperature of 130° C., and an injection speed of 30 mm/s. When the resin composition filled about 90% of the molded article volume, conditions were switched to dwelling, and consecutive molding was performed with dwelling set within 10 to 80 MPa. The number of shots where burning or short shots occurred in portions near the vent parts of the molded article was observed visually. When the number of consecutive shots is 60 or greater, preferably 75 or greater, the effect of suppressing mold deposit formation in the vent parts is high, and even when the molded article is made on an industrial scale, the mold exchange frequency will be low.

(Heat Shock Resistance)

Figure 2A:
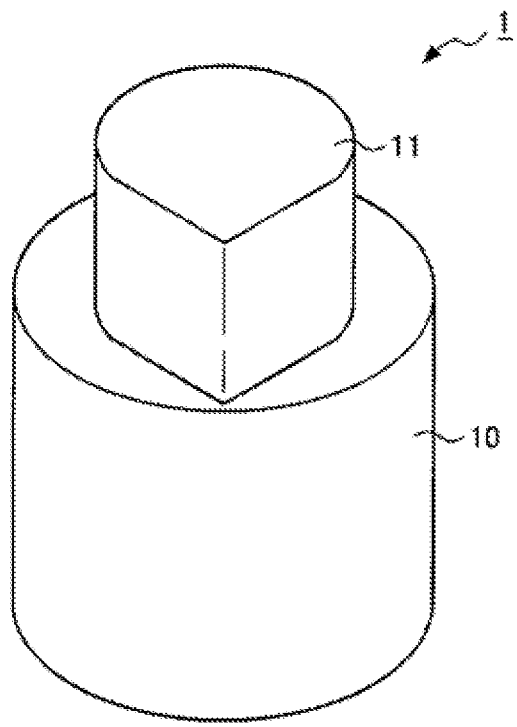
FIGS. 2(a) and 2(b) are drawings showing a test piece used in the heat shock resistance test, with FIG. 2(a) being a perspective view and FIG. 2(b) being a plan view.
Figure 2B:
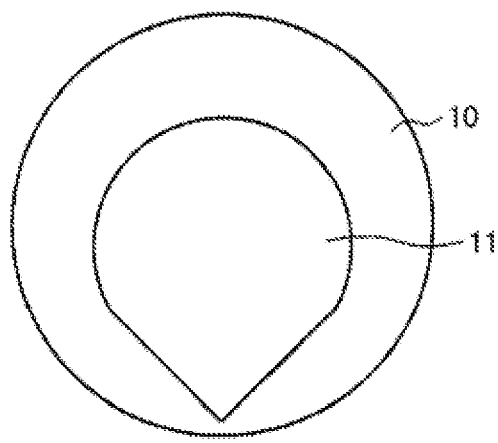
Figure 3A:
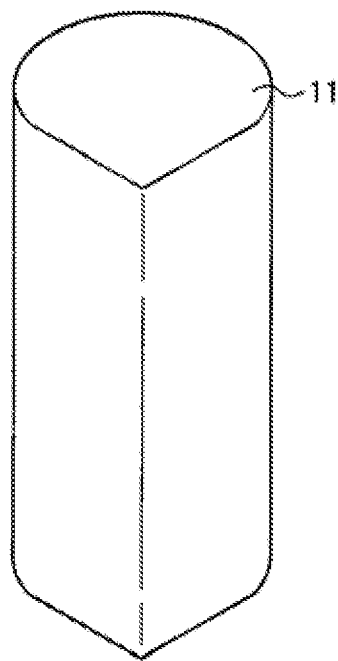
FIGS. 3(a) and 3(b) are drawings showing an insert member of the test piece shown in FIGS. 2(a) and 2(b), with FIG. 3(a) being a perspective view and FIG. 3(b) being a magnified plan view of the sharp-angle-shape part.
Figure 3B:
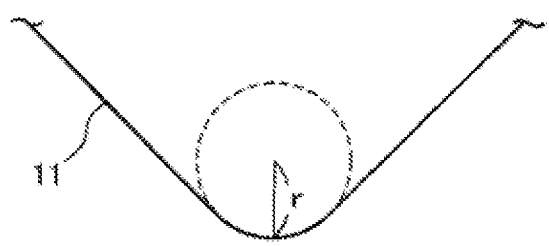
Figure 4A:
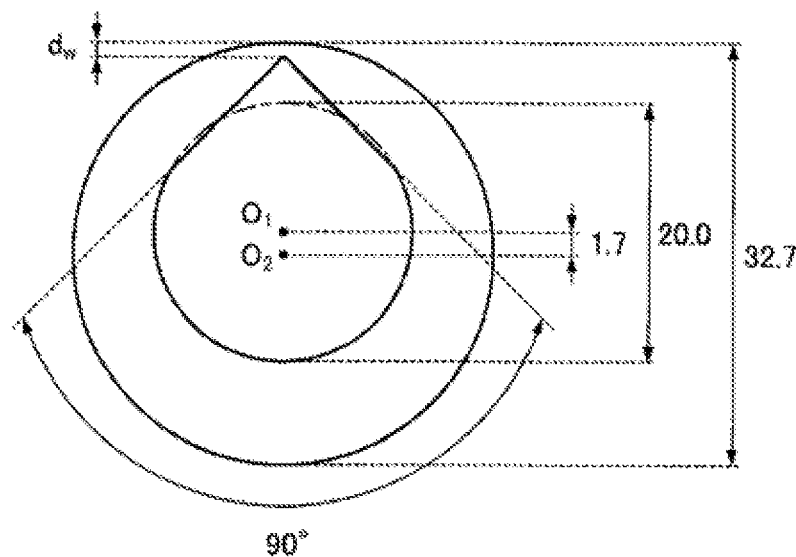
FIGS. 4(a) and 4(b) are explanatory drawings regarding the dimensions of the test piece shown in FIGS. 2(a) and 2(b), with FIG. 4(a) being a plan view and FIG. 4(b) being a side view.
Figure 4B:
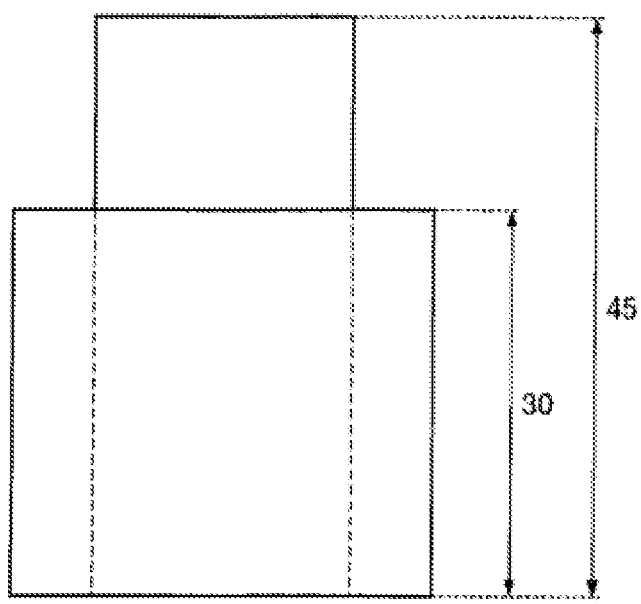

The resin compositions and metal insert members were used to insert mold test pieces shown in FIG. 2(a) to FIG. 4(b) by injection molding, and heat shock resistance (HS resistance) was evaluated. FIGS. 2(a) and 2(b) each shows an insert molded test piece 1, FIGS. 3(a) and 3(b) each shows an insert member 11, and FIGS. 4(a) and 4(b) each shows the dimensions of test piece 1. Test piece 1, as shown in FIGS. 2(a) and 2(b), is molded in a form where the metal insert member 11 is embedded in a cylindrical resin member 10 containing the resin composition. The cylindrical resin member 10 is molded using a pellet obtained as described above. Insert member 11, as shown in FIGS. 3(a) and 3(b), is pillar-shaped, and has upper and bottom surfaces formed such that one side takes a circular arc shape and the other side takes a sharp-angle tear shape. The sharp-angle-shape part, as shown in the partially magnified view in FIG. 2(b), has a circular arc-shaped tip with a radius of curvature r of 0.2 mm. Moreover, insert member 11 is higher than the height of the cylindrical resin member 10, and has a protruding portion (see FIG. 2(a)). Further, as shown in FIG. 4(a), the center $O_1$ of the circle which the circular arc of insert member 11 is a part of does not coincide with the center $O_2$ of the circle of resin member 10, with the sharp-angle-shape side of insert member 11 positioned in a manner approaching a side surface of resin member 10. Additionally, the distance dw between the tip of the sharp-angle-shape of insert member 11 and the side surface of resin member 10 is 1 mm, and in resin member 10, the portion in the vicinity of the tip of the sharp-angle shape of insert member 11 is a thin welded portion. Moreover, FIGS. 4(a) and 4(b) provide numerical values for the dimensions of the test piece, the unit thereof being mm.

For the above-mentioned test pieces, a thermal shock chamber (made by ESPEC Corp.) was used to repeat cycles of cooling for 1.5 hours at −40° C. followed by heating for 1.5 hours at 180° C., and the welded portions were observed every 20 cycles. Evaluation was carried out using the number of cycles when the welded portion cracked as an indicator of heat shock resistance. Results are shown in Tables 1 and 2. When the number of cycles is 140 or greater, heat shock resistance is excellent, and when the number of cycles is 170 or more, heat shock resistance is particularly excellent.

TABLE 1

|  | Ex. 1 | Ex. 2 | Ex. 3 | Ex. 4 | Ex. 5 | Ex.6 | Ex. 7 | Ex. 8 | Ex. 9 |
|---|---|---|---|---|---|---|---|---|---|
| PPS (parts by mass) | PPS-2 (100) | PPS-2 (100) | PPS-2 (100) | PPS-2 (80) | PPS-2 (70) | PPS-2 (60) | PPS-2 (60) | PPS-1 (100) | PPS-2 (60) |
| PPS (parts by mass) | — | — | — | PPS-4 (20) | PPS-4 (30) | PPS-4 (40) | PPS-4 (40) | — | PPS-4 (40) |
| Polymer melt viscosity (Pa · s) | 130 | 130 | 130 | 97 | 83 | 72 | 72 | 220 | 72 |
| Glass fibers (parts by mass) | 45.8 | 46.3 | 47.1 | 46.7 | 46.7 | 46.7 | 46.7 | 26.6 | 73.6 |
| Olefinic copolymer species | B-1 | B-1 | B-1 | B-1 | B-1 | B-1 | B-2 | B-1 | B-1 |
| Olefinic copolymer amount added (parts by mass) | 1.8 | 3.1 | 4.7 | 3.9 | 3.9 | 3.9 | 3.9 | 2.0 | 3.7 |
| Antioxidant C-1 (parts by mass) | — | — | — | — | — | — | — | — | — |
| Number of consecutive shots | 150 | 100 | 70 | 80 | 85 | 85 | 80 | 130 | 100 |
| HS resistance (number of test cycles) | 160 | 200 | 300 | 200 | 170 | 170 | 150 | 320 | 160 |
| Flow length (mm) | 150 | 135 | 105 | 140 | 150 | 160 | 145 | 90 | 100 |

|  | Ex. 10 | Ex. 11 | Ex. 12 | Comp. Ex. 1 | Comp. Ex. 2 | Comp. Ex. 3 | Comp. Ex. 4 | Comp. Ex. 5 | Comp. Ex. 6 |
|---|---|---|---|---|---|---|---|---|---|
| PPS (parts by mass) | PPS-2 (60) | PPS-2 (100) | PPS-2 (100) | PPS-2 (70) | PPS-2 (60) | PPS-4 (100) | PPS-3 (100) | PPS-5 (100) | PPS-2 (50) |
| PPS (parts by mass) | PPS-4 (40) | — | — | PPS-4 (30) | PPS-4 (40) | — | — | — | PPS-4 (50) |
| Polymer melt viscosity (Pa · s) | 72 | 130 | 130 | 83 | 72 | 30 | 55 | 400 | 62 |
| Glass fibers (parts by mass) | 74.3 | 46.3 | 40.6 | 45.3 | 47.8 | 47.1 | 46.0 | 46.3 | 46.3 |
| Olefinic copolymer species | B-1 | B-1 | B-1 | B-1 | B-1 | B-1 | B-1 | B-2 | B-1 |
| Olefinic copolymer amount added (parts by mass) | 4.6 | 3.1 | 3.1 | 0.75 | 6.4 | 4.7 | 2.3 | 3.1 | 3.1 |
| Antioxidant C-1 (parts by mass) | — | 0.29 | 0.89 | — | — | — | — | — | — |
| Number of consecutive shots | 80 | 120 | 125 | 200 | 40 | 75 | 105 | 90 | 100 |
| HS resistance (number of test cycles) | 180 | 250 | 260 | 120 | 180 | 70 | 90 | 400 | 120 |
| Flow length (mm) | 95 | 135 | 140 | 165 | 140 | 210 | 170 | 10 | 170 |

TABLE 2

|  | Ex. 13 |
|---|---|
| PPS (parts by mass) | PPS-1 (30) |
| PPS (parts by mass) | PPS-2 (70) |
| Polymer melt viscosity (Pa · s) | 152 |
| Glass fibers (parts by mass) | 46.3 |
| Olefinic copolymer species | B-1 |
| Olefinic copolymer amount added (parts by mass) | 3.1 |
| Antioxidant C-1 (parts by mass) | 0.29 |
| Number of consecutive shots | 120 |
| HS resistance (number of test cycles) | 300 |
| Flow length (mm) | 110 |

As can be seen from Table 1, the insert molded articles using the polyarylene sulfide resins of Examples 1-12 all had a number of consecutive shots of 60 or greater, 140 cycles or greater for the heat shock resistance test, and a flow length of at least 80 mm and at most 200 mm for a width of 20 mm and a thickness of 1 mm at a cylinder temperature of 320° C., an injection pressure of 100 MPa, and a mold temperature of 150° C. In other words, the resin compositions of Examples 1-12 can markedly suppress mold deposits during molding while maintaining high heat shock resistance and good flowability. As can be seen from Table 2, effects similar to the above can also be achieved for the resin composition of Example 13.

Meanwhile, the resin composition of Comparative Example 1 with a low olefinic copolymer content does not have sufficient heat shock resistance, and the resin composition of Comparative Example 2 with a high olefinic copolymer content has a low number of consecutive shots, and does not achieve the effect of preventing mold deposit formation. As for Comparative Examples 3, 4, and 6, wherein the polyarylene sulfide resin has a low melt viscosity, heat shock resistance is insufficient, and the resin composition of Comparative Example 5 which has a high melt viscosity has poor flowability and insufficient moldability.

DESCRIPTION OF REFERENCE NUMBERS

1 Test piece
10 Resin member
11 Insert member
100 Molded article

The invention claimed is:

1. A polyarylene sulfide resin composition comprising:
a polyarylene sulfide resin,
an olefinic copolymer comprising an α-olefin-derived structural unit and an α,β-unsaturated acid glycidyl ester-derived structural unit, and
a fibrous inorganic filler,
wherein the olefinic copolymer content is at least 1.0 parts by mass and less than 5.0 parts by mass with respect to 100 parts by mass of the polyarylene sulfide resin;
a melt viscosity of the polyarylene sulfide resin, measured at 310° C. and a shear rate of 1216 sec$^{-1}$, is at least 70 Pa·s and at most 250 Pa·s;
a flow length of the polyarylene sulfide resin composition for a width of 20 mm and a thickness of 1 mm, at a cylinder temperature of 320° C., an injection pressure of 100 MPa and a mold temperature of 150° C., is at least 80 mm and at most 200 mm, and
the content of the α,β-unsaturated acid glycidyl ester-derived structural unit in the olefinic copolymer is at least 0.02 mass % and at most 0.16 mass % in the polyarylene sulfide resin composition.

2. The polyarylene sulfide resin composition according to claim 1, wherein the olefinic copolymer further comprises a (meth)acrylic acid ester-derived structural unit.

3. The polyarylene sulfide resin composition according to claim 1, wherein the inorganic filler content is at least 20 parts by mass and at most 80 parts by mass with respect to 100 parts by mass of the polyarylene sulfide resin.

4. The polyarylene sulfide resin composition according to claim 1, comprising an antioxidant.

5. The polyarylene sulfide resin composition according to claim 4, wherein the antioxidant is a phenolic antioxidant.

6. The polyarylene sulfide resin composition according to claim 4, wherein the antioxidant content is more than 0 parts by mass and at most 1.5 parts by mass with respect to 100 parts by mass of the polyarylene sulfide resin.

7. An insert molded article having a resin member comprising the polyarylene sulfide resin composition according to claim 1 and an insert member comprising a metal, an alloy, or an inorganic solid.

* * * * *